United States Patent
Burns et al.

(10) Patent No.: US 6,760,377 B1
(45) Date of Patent: Jul. 6, 2004

(54) SIGNAL PROCESSING

(75) Inventors: James Edward Burns, Basingstoke (GB); Robert Mark Stefan Porter, Maidenhead (GB); Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/548,446

(22) Filed: Apr. 13, 2000

(30) Foreign Application Priority Data

Apr. 16, 1999 (GB) .............................. 9908809

(51) Int. Cl.⁷ .............................. H04B 1/66
(52) U.S. Cl. .............................. 375/240.15
(58) Field of Search ............ 375/240, 240.01, 375/240.02, 240.03, 240.04, 240.12, 240.13, 240.14, 240.15, 240.16, 240.17, 240.18, 240.25, 240.26, 240.27; 348/413.1, 425.1, 571, 705; H04B 1/66; H04N 7/12

(56) References Cited

U.S. PATENT DOCUMENTS

| | | | |
|---|---|---|---|
| 6,137,946 A | | 10/2000 | Ando |
| 6,314,138 B1 | * | 11/2001 | Lemaguet .................. 375/240 |
| 6,388,968 B1 | * | 5/2002 | Ohta et al. ............... 369/53.45 |
| 6,611,624 B1 | * | 8/2003 | Zhang et al. ............. 382/232 |

FOREIGN PATENT DOCUMENTS

| | | | | |
|---|---|---|---|---|
| DE | EP 0 923 243 A1 | * | 6/1999 | ........... H04N/5/92 |
| DE | EP 0 982 736 A1 | * | 3/2000 | ........... G11B/20/10 |
| EP | 1 045 589 A2 | * | 10/2000 | ........... H04N/7/24 |
| EP | 1 079 630 | * | 2/2001 | ........... H04N/7/24 |
| EP | 1 079 631 | * | 2/2001 | ........... H04N/7/24 |
| WO | WO96/17492 | | 6/1996 | |
| WO | WO 97 08898 | | 3/1997 | |
| WO | WO98/44737 | | 10/1998 | |
| WO | WO 99 05864 | | 2/1999 | |
| WO | WO99/13649 | | 3/1999 | |

OTHER PUBLICATIONS

Brightwell et al: "Flexible Switching and Editing of MPEG-2 Video Bitstreams" International Broadcasting Convention, London, GB, Sep. 12, 1997, pp. 547–552, XP002098561.

Yogeshwar J et al: "Picture Quality Editing for Variable Rate Compressed Video" Smpte Journal, Smpte Inc. Scarsdale, N.Y, US, vol. 107, No. 4, Apr. 1, 1998, pp. 236–242, XP000774751 ISSN: 0036–1682.

Patent Abstracts of Japan, vol. 1999, No. 01, Jan. 29, 1999, & JP 10 285529 A (Sony Corpo), Oct. 23 1998.

* cited by examiner

*Primary Examiner*—Tung T. Vo
(74) *Attorney, Agent, or Firm*—Frommer Lawrence & Haug LLP; William S. Frommer

(57) ABSTRACT

Decoders A and B decode MPEG-2 bitstreams A and B. A switch (S1) switches from decoded stream A to decoded stream B to achieve a splice. The resulting bitstream is re-encoded in an encoder 4. A new GOP is defined beginning at the splice. The new GOP is defined by picture type decision rules which may the effect of changing the GOP compared to the GOPs of streams A and B. The new GOP provides a prediction of the position in stream B where the occupancy value of stream C should coincide with that of B. A target for the new number of bits in the new GOP is calculated dependent on the difference between the occupancy value of stream C at the splice and a prediction of the occupancy of stream B at the predicted position. The occupancy value of stream C is controlled in accordance with the target so that it tends towards the occupancy value of stream B at the predicted position.

55 Claims, 12 Drawing Sheets

Display order, showing picture type decision - long latency

```
Frame No.   0  1  2  3  4  5  6  7  8  9 10 11 12 13 14 15 16 17 18 19 20 21 22 23
Stream A :  B  B  I  B  B  P  B  B  P  B  B  P  B  B  I  B  B  P  B  B  P  B  B  P
Stream B :  .  .  B  B  I  B  B  P  B  B  P  B  B  P  B  B  I  B  B  P  B  B  P  B Stream C :  B  B  I  B  B  P  B  B  P  B  B  P  B  B  I  B  B  P  B  B  P  B  B  P Stream Cᴵ:  B  B  I  B  B  P  B  B  P  B  B  P  B  B  I  B  B  P  B  B  P  B  B  P
            ~  ~  ~  ~  ~  ~  ~  ~  ~  ~  ~  ~  ~  ~  ~  ~  ~  ~  ~  ~  ~  ~  ~  ~
```

SPLICE POINT

```
Frame No.  24 25 26 27 28 29 30 31 32 33 34 35 36 37 38 39 40 41 42 43 44 45 46 47
Stream A :  B  B  I  B  B (P  B  B  P  B  B  P  B  B  I  B  B  P  B  B  P  B  B  P)
Stream B :  B  P  B  B  I  B  B  P  B  B  P  B  B  P  B  B  I  B  B  P  B  B  P  B Stream C :  B  B  I  B  B  B  B  P  B  B  P  B  B  P  B  B  I  B  B  P  B  B  P  B Stream Cᴵ:  B  B  P  B  P  B  B  I  B  B  P  B  B  P  B  B  P  B  B  P  B  B  P  B
            *  *  *  *  *  *  *  *  *  *  *  *  *  *  *  *  *  *  *  *  *  *  *  *
               (1)   (2)      (3)                     (4)

Frame No.  48 49 50 51 52 53 54 55 56 57 58 59 60 61 62 63 64 65 66 67 68 69 70 71
(Stream A:  B  B  I  B  B  P  B  B  P  B  B  P  B  B  I  B  B  P  B  B  P  B  B  P)
Stream B :  B  P  B  B  I  B  B  P  B  B  P  B  B  P  B  B  I  B  B  P  B  B  P  B Stream C :  B  P  B  B  I  B  B  P  B  B  P  B  B  P  B  B  I  B  B  P  B  B  P  B Stream Cᴵ:  B  P  B  B  I  B  B  P  B  B  P  B  B  P  B  B  I  B  B  P  B  B  P  B
            *  *  *  *  ~  ~  ~  ~  ~  ~  ~  ~  ~  ~  ~  ~  ~  ~  ~  ~  ~  ~  ~  ~
```

VBV Lock

```
Frame No.  72 73
Stream A :  .  .
Stream B :  B  P           ~ = reuse
                           * = recode ( transition period )
Stream C :  B  P Stream Cᴵ:  B  P
            ~  ~
```

Stream Cᴵ = Final Stream C (after picture type decisions)
(1), (2), (3), (4) = Picture type decisions made at frames

*Fig. 4*

Processing order, as shown on VBV occupancy graphs - long latency

| Frame No. | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Stream A: | I | B | B | P | B | B | P | B | B | P | B | B | I | B | B | P | B | B | P | B | B | P | B | B |
| Stream B: | . | . | I | B | B | P | B | B | P | B | B | P | B | B | I | B | B | P | B | B | P | B | B | P |
| Stream C': | I | B | B | P | B | B | P | B | B | P | B | B | I | B | B | P | B | B | P | B | B | P | B | B |
|  | ~ | ~ | ~ | ~ | ~ | ~ | ~ | ~ | ~ | ~ | ~ | ~ | ~ | ~ | ~ | ~ | ~ | ~ | ~ | ~ | ~ | ~ | ~ | ~ |
| Disp C': | 2 | 0 | 1 | 5 | 3 | 4 | 8 | 6 | 7 | 11 | 9 | 10 | 14 | 12 | 13 | 17 | 15 | 16 | 20 | 18 | 19 | 23 | 21 | 22 |

SPLICE POINT

| Frame No. | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|---|
| Stream A: | I | B | B | P | B | (B | P | B | B | P | B | B | I | B | B | P | B | B | P | B | B | P | B | B) |
| Stream B: | B | B | I | B | B | P | B | B | P | B | B | P | B | B | I | B | B | P | B | B | P | B | B | P |
| Stream C': | P | B | B | P | B | I | B | B | P | B | B | P | B | B | P | B | B | P | B | B | P | B | B | P |
|  | * | * | * | * | * | * | * | * | * | * | * | * | * | * | * | * | * | * | * | * | * | * | * | * |
| Disp C': | 26 | 24 | 25 | 28 | 27 | 31 | 29 | 30 | 34 | 32 | 33 | 37 | 35 | 36 | 40 | 38 | 39 | 43 | 41 | 42 | 46 | 44 | 45 | 49 |

| Frame No. | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|---|---|---|---|---|---|
| Stream A: | (I | B | B | P | B | B | P | B | B | P | B | B | I | B | B | P | B | B | P | B | B | P | B | B) |
| Stream B: | B | B | I | B | B | P | B | B | P | B | B | P | B | B | I | B | B | P | B | B | P | B | B | P |
| Stream C': | B | B | I | B | B | P | B | B | P | B | B | P | B | B | I | B | B | P | B | B | P | B | B | P |
|  | * | * | ~ | * | * | ~ | ~ | ~ | ~ | ~ | ~ | ~ | ~ | ~ | ~ | ~ | ~ | ~ | ~ | ~ | ~ | ~ | ~ | ~ |
| Disp C' | 47 | 48 | 52 | 50 | 51 | 55 | 53 | 54 | 58 | 56 | 57 | 61 | 59 | 60 | 64 | 62 | 63 | 67 | 65 | 66 | 70 | 68 | 69 | 73 |

VBV Lock    Exact Lock Achieved

| Frame No. | 72 | 73 |
|---|---|---|
| Stream A: | . | . |
| Stream B: | B | B |
| Stream C': | B | B |
|  | ~ | ~ |
| Disp C' | 71 | 72 |

~ = reuse
* = recode (transition period)

Frame No. = processing order frame no.
Disp C' = display order frame no. for stream C (after picture type decisions)

Fig.5

VBV occupancy for short latency "long GOP - long GOP" splice

VBV occupancy for short latency "long GOP - long GOP" splice

VBV occupancy for short latency "long GOP - long GOP" splice

VBV occupancy for short latency "long GOP - long GOP" splice

SIGNAL PROCESSING

BACKGROUND OF THE INVENTION

1. Field of the Invention

The present invention relates to a signal processor, a method of signal processing, and a computer program product for implementing the method. The invention concerns joining digital bit streams which are compressed: that is referred to herein as splicing. Embodiments of the invention described herein are concerned with splicing digital video bitstreams which are compressed according to the MPEG-2 standard.

2. Description of the Prior Art

The invention and its background will be discussed by way of example with reference to MPEG-2 video bitstreams. However the invention is not limited to MPEG-2.

MPEG-2 is well known from see for example ISO/IEC/ 13818-2, and will not be described in detail herein. Splicing of video is well known. It is used in editing video. Splicing analogue signals is relatively straight forward and can be done at the boundary between adjacent frames, because each analogue frame contains the whole of the video information of that frame independently of other frames. Splicing can be done similarly in the digital domain for both compressed and uncompressed video data if all frames contain the whole video information of the frame.

MPEG-2 compressed video comprises groups of I and P and/or B frames known as GOPs, Groups of Pictures. I, P and B frames are well known. An I or Intra-encoded frame contains all the information of the frame independently of any other frame. A P frame in a GOP ultimately depends on an I frame and may depend on other P frames. A B frame of a GOP ultimately depends on an I-frame and may depend on P frames in the GOP, but not on another B frame.

A GOP typically comprises 12 or 15 frames comprising at least one I frame and several P and B frames. To correctly decode a GOP requires all the frames of the GOP, because a large part of the video information required to decode a B frame in the GOP is in a preceding and/or succeeding frame of the GOP. Likewise a large part of the video information required to decode a P frame is in a preceding frame of the GOP.

Thus if two different bit streams are spliced together in the compressed domain, the information necessary to decode frames each side of the splice point is likely to be lost.

Many papers have been written concerning the splicing of compressed bitstreams, which is a well known problem in MPEG. A paper "Flexible Switching and editing of MPEG-2 Video Bitstreams" by P. J. Brightwell, S. J. Dancer and M. J. Knee was published in "Atlantic Technical Papers 1996/ 1997" the preface to which is dated September 1997.

The paper discusses the problems of splicing MPEG-2 Video Bitstreams. Two bitstreams A and B to be spliced are decoded in respective decoders. A coder is switched from the decoder of A to the decoder of B at the splicing point. It discloses that near a splicing point where a bitstream A is replaced by a bitstream B, the following modifications are made.

"The picture type may be changed to provide a more suitable refresh strategy around the switch point. In the example below, the first P-frame in bitstream B after the switch is converted to an I-frame to provide a full refresh early in the new scene. Also, bitstream A contains an I-frame just before the switch point—as this is unnecessary, it is recoded as a P-frame to save bits.

|  |  |  |  |  | Switch point |  |  |  |  |  |  |  |
|---|---|---|---|---|---|---|---|---|---|---|---|---|
| bitstream | A: | P | B | B | I | ... |  |  |  |  |  |  |
| bitstream | B: |  |  |  | ... | B | P | B | B | P | B | B | P |
| modified |  | P | B | B | P | B | I | B | B | P | B | B | P |

Prediction modes and motion vectors may require modification to take into account any changes in the picture type on recoding, or to prevent any predictions being made across the switch on recoding. In the example above, macroblocks that originally used forward or bi-directional prediction for the B-frame following the switch point will be recoded using intra mode and backward prediction respectively. In addition, vectors are required for the I-frame that is recoded as a P-frame—these can be estimated from the vectors in surrounding frames, or taken from I-frame concealment vectors that many MPEG-2 bitstreams carry.

The quantisation parameters will be changed as part of the recoder's rate control strategy. As in a conventional coder, this aims to control the buffer trajectory of a downstream decoder to prevent under- or overflow, and to maintain the picture quality as high as possible. In addition, the rate control algorithm for the ATLANTIC switch uses the vbv_ delay values in bitstreams A an B (which are carried in the info-bus) to make the buffer trajectory for the switched bitstream identical to that for bitstream B (i.e. the one being switched to) at some future time. Depending on the relative vbv_delay values, this may happen soon after the switch, or a recovery period of a few GOPs may be required. When it has been achieved, the recoder's quantisation parameters are locked to those of bitstream B, and the switch becomes transparent.

The quantisation parameters may also be changed to take advantage of an effect known as temporal masking. This refers to the eye's inability to see moderate or even large amounts of noise around a scene change—typically 5 dB of degradation in the frame after the switch cannot be seen— and allows the number of bits used for the frames very close to the switch point to be reduced, allowing a shorter recovery period."

"Vbv-delay values" are measures of the number of bits in the buffer of the down stream decoder. The manner in which the "buffer trajectory" for the switch bitstream is made identical to that for bitstream B is not disclosed in the paper. Also the time scale over which that happens may be "soon after the switch" or after a few GOPs.

SUMMARY OF THE INVENTION

It is desirable to make the buffer trajectory for the switched bit stream identical to that for the bitstream B in a more predictable time-scale, preferably one GOP.

According to one aspect of the present invention, there is provided a signal processor for splicing a compressed bitstream B to a compressed bitstream A, comprising means for decoding the bitstreams A and B, means for switching from decoded bitstream A to decoded bitstream B to splice bitstream B to bitstream A to produce a spliced bitstream C, encoding means for re-encoding the spliced bitstream C for supply to a downstream decoder having a downstream buffer, wherein the encoding is controlled by control means to produce a prediction of the position on bitstream B at which occupancy of the downstream buffer by spliced bitstream C equals what would have been the occupancy by bitstream B alone, and the value of occupancy for bitstream C is controlled between the splice point and the said predicted position in accordance with the difference between the occupancy value of stream A immediately before the splice and a prediction of the occupancy value of bitstream C at the said predicted position.

Thus by providing predictions of both the position at which occupancy of stream C equals that of B, and of the occupancy value, and controlling the occupancy value in accordance with the predictions, lock tends to be achieved more reliably in a more predictable time scale.

Another aspect of the present invention provides a signal processing method for splicing a compressed bitstream B to a compressed bitstream A, comprising decoding the bitstreams A and B, switching from decoded bitstream A to decoded bitstream B to splice bitstream B to bitstream A to produce a spliced bitstream C, re-encoding the spliced bitstream C for supply to a downstream decoder having a downstream buffer, wherein the encoding is controlled to produce a prediction of the position on bitstream B at which occupancy of the downstream buffer by spliced bitstream C equals what would have been the occupancy by bitstream B alone, and the value of occupancy for bitstream C is controlled between the splice point and the said predicted position in accordance with the difference between the occupancy value of stream A immediately before the splice and a prediction of the occupancy value of bitstream C at the said predicted position.

Yet another aspect of the present invention provides a computer program product arranged to implement the method of said another aspect when run on a programmable signal processor.

BRIEF DESCRIPTION OF THE DRAWINGS

For a better understanding of the present invention, reference will now be made by way of example to the accompanying drawings, in which:

FIG. 4 shows illustrative GOPs in display order and the application of illustrative picture type decisions;

FIG. 5 shows the GOPs of FIG. 4 in processing order;

DESCRIPTION OF THE PREFERRED EMBODIMENTS

Transcoding Parameters

I frames have the following transcoding parameters which are well known in MPEG:

DCT_Type, Q and Q_Matrix which are reused in embodiments of the present invention described hereinbelow. These parameters are reused in the recoding of I frames with reuse of parameters. These parameters are recalculated when fully recoding I frames.

P and B frames have the parameters DCT_Type, Q, Q_Matrix, Pred_Type, MB_Mode and Motion Vectors. These parameters are reused in the recoding of P and B frames with reuse of parameters. These parameters are recalculated when fully recoding all frames.

Overview

Figure 1:
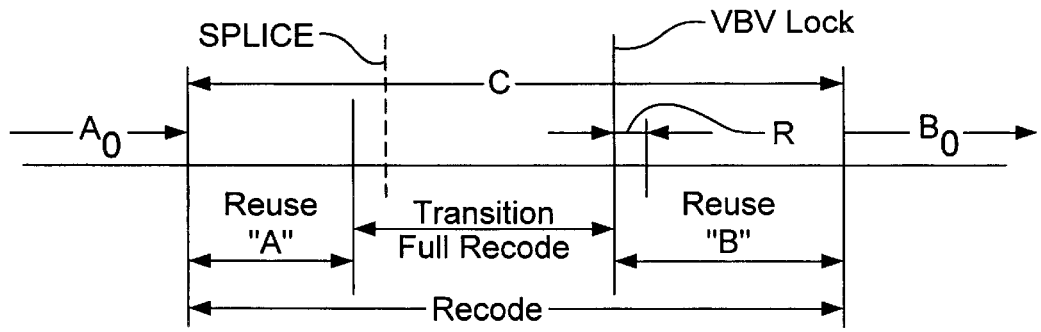
FIG. 1 is a time chart illustrating the splicing of a bitstream $B_0$ to a bitstream $A_0$ in accordance with an example of the present invention.
Figure 3:
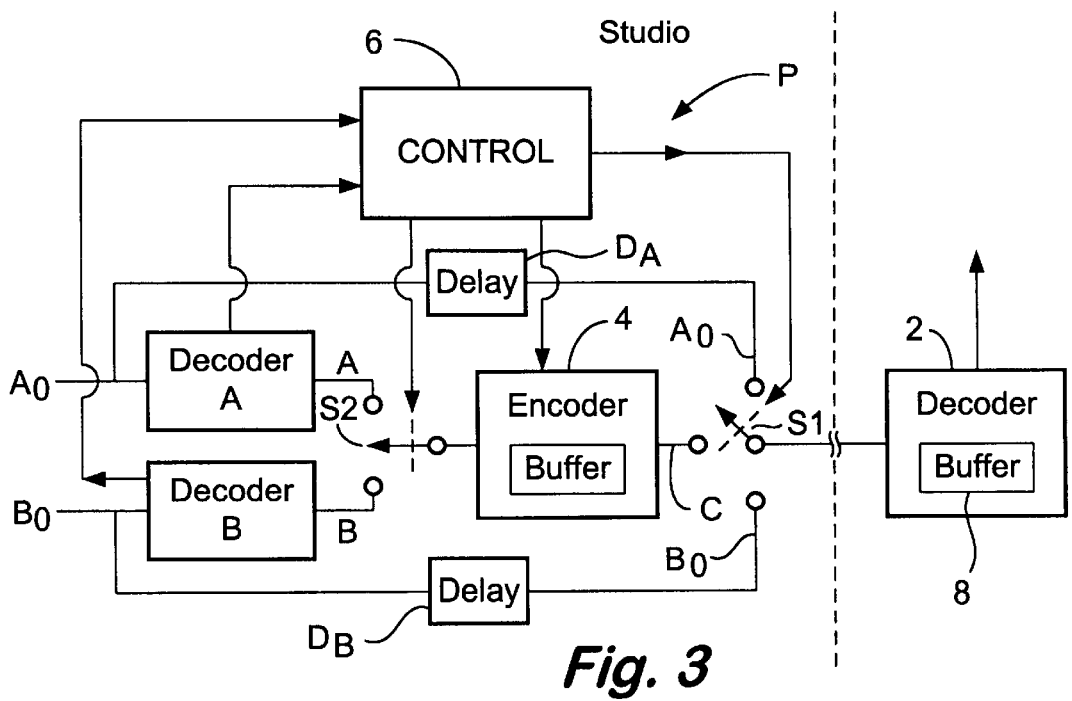
FIG. 3 is a schematic block diagram of an illustrative signal processor according to the present invention.

Referring to FIGS. 1, 3 and 4, two bitstreams $A_0$ and $B_0$ are MPEG-2 encoded with GOPs comprising 12 frames. In this example the bitstreams $A_0$ and $B_0$ have the same GOP structure:

IBBPBBPBBPBB as shown in FIG. 4. However the bitstreams may have any other GOP structure allowed by MPEG-2. The two bitstreams $A_0$ and $B_0$ may have different GOP structures. For ease of explanation it is assumed the bitstreams $A_0$ and $B_0$ have the same GOP structure as shown in FIG. 4.

It is desired to replace bitstream $A_0$ by bitstream $B_0$. As shown in FIG. 1, initially $A_0$ is provided to the processor. It is routed in the processor P of FIG. 3 from input $A_0$ to contact $A_0$ of switch $S_1$ where it is fed, unchanged to, for example, a downstream decoder 2. In decoder 2 it is decoded for display. Downstream decoder 2 may be in, for example, a domestic television receiver. Processor P may be in a studio.

When an operator decides to splice bitstreams $B_0$ and $A_0$, the operator operates the switch S1 and a switch S2 so that $A_0$ is routed through a decoder A, an encoder 4 and via contact C of switch S1 to the downstream decoder 2.

The bitstream $A_0$ is decoded in decoder A and re-encoded in encoder 4. The MPEG-2 parameters are derived from the decoder A by a control processor 6 and re-used in the encoder 4, so that the decoding and re-encoding is as loss-less as possible. (There may be some loss because the DCT rounding process can cause the DCT process to be not transparent.)

Bitstream $B_0$ input at input $B_0$ is also decoded in a decoder B. The decoded bitstream $B_0$ is supplied to contact B of switch S2.

The processor P has sufficient storage (not shown) associated with decoders A and B to store for example 30 compressed frames.

A splice point SPLICE is chosen. At the splice point switch S2 selects the decoder B and decoded bitstream B is fed via the encoder 4 to the contact C of switch S1. In the example of FIGS. 1 and 4, full recoding, that is without re-use of the MPEG parameters, begins on the bitstream $A_0$ 5 frames before the splice point SPLICE. The reason for this will be explained below. After the splice, bitstream $A_0$ is irrelevant except that some frames of $A_0$ after the splice may be needed to decode frames of $A_0$ occurring before the splice.

After the splice point SPLICE, the bitstream $B_0$ is fully recoded for a transition period during which VBV_lock is achieved as will be explained below. Once VBV_lock is achieved, recoding of bitstream $B_0$ continues but with re-use of the MPEG parameters derived from the original bitstream $B_0$.

After a short interval of recoding of $B_0$ with re-use of the MPEG parameters, switch S1 selects contact $B_0$ and thus the original bitstream $B_0$, by-passing the decoder B and encoder C.

FIG. 1 shows a period "Reuse "A"" preceding the "full recode" period. Reuse "A" is optional in that period. The original bitstream $A_0$ may be used in that period, unchanged. Also the period of Reuse of "B" after the achievement of exact lock as described below is optional. The original bitstream $B_0$ may be used unchanged.

The processor P has delays $D_A$ and $D_B$ in the direct signal paths from inputs $A_0$ and $B_0$ to the contacts $A_0$ and $B_0$ of switch S1 for compensating for the signal processing delays in the decoders A and B and the encoder 4.

Picture Type Decisions

The splicing of bitstream $B_0$ to bitstream $A_0$ disrupts the GOP structure. Thus the following rules are applied in a first method to be described herein below. In a second method they are applied but in modified form as described herein below.

The bit stream $A_0$, in the example of the first method, before the splice is recoded so that:

(1) the two 'I' or 'P' frames before the splice are converted to 'P';

(2) if the last frame before the splice is a 'B' frame, it is converted to 'P'.

The bitstream, in this example $B_0$, after the splice is recoded so that:

(3) the first 'I' or 'P' frame after a splice is converted to 'I'; and (4) if the first GOP after the splice and after the application of rule (3) contains less than three 'P' frames, the 'I' frame of the subsequent GOP is converted to 'P', thereby lengthening the GOP.

In effect, a new transitional GOP begins with an I-frame at the splice. The new GOP may be different in length, e.g. longer or shorter than preceding (and succeeding) GOPs in the bitstream $B_0$. It may be the same length as the original GOPs. The new GOP is in effect a prediction of where VBV_lock is to be achieved. The application of these rules is shown in FIG. 4 at (1), (2), (3) and (4).

In FIG. 4 A is bitstream $A_0$,

B is bitstream $B_0$, and

C is the spliced bitstream, at contact C of switch S1 as if the picture type decisions have not been made, and $C^1$ is the spliced bitstream at contact C with the picture type decisions applied to it.

By application of rule (2), the 'B' frame of $A_0$ immediately before the splice is converted to P. By application of rule (1) the I frame of $A_0$ before the splice is also converted to P.

By application of rule (3), the first 'P' frame of stream $B_0$ after the splice is converted to I in stream $C^1$.

By application of rule (4), the GOP of bitstream $B_0$ after the splice has (after conversion of its first P frame to I) less than 3 'P' frames. Therefore the next 'I' frame is converted to 'P'. Application of these rules gives a GOP which defines a predicted VBV_lock point as will be discussed below.

Processing Order

FIG. 4 shows the frames of the bitstreams in the order in which they are displayed or would be displayed. The frames are not processed in that order. FIG. 5 shows the order in which the frames are processed. For example, referring to FIG. 4 (Display Order) frames 0, 1 and 2 row of bitstream A are shown in that order. Even though the B frames 0 and 1 would be displayed before I frame 2, they depend on I frame 2 to be decoded. Thus to decode them I frame 2 must precede the B frames as shown in FIG. 5. Likewise B frames 3 and 4 of FIG. 4 depend on P frame 5 of FIG. 4; thus in FIG. 5 P frame 5 of FIG. 4 becomes P frame 3 preceding the two B frames.

Constant Bit Rate

The example of the processor P of FIG. 3, has a constant bit rate. The bitstreams $A_0$ $B_0$, have a fixed bit rate and the encoder 4 produces at contact C of switch S1 a constant bit rate.

Downstream Decoder and Buffer

Figure 6:
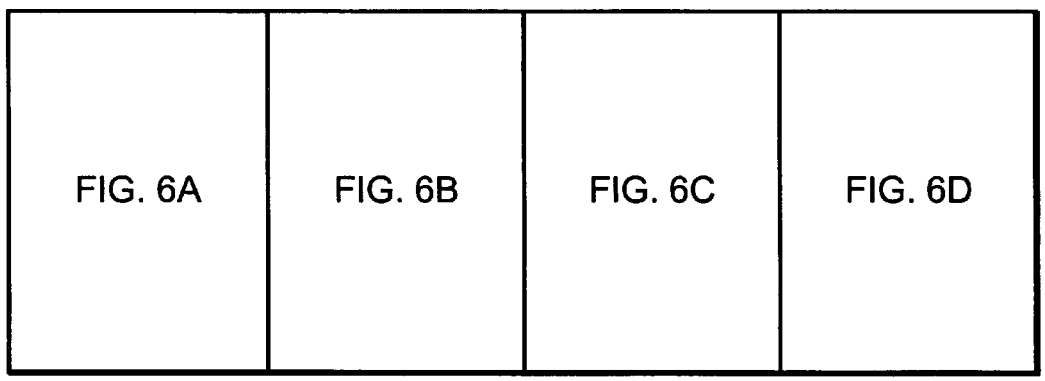
FIGS. 6, 6A to 6D, show VBV occupancy for the GOPs of FIG. 4 for one embodiment of the invention.
Figure 6A:
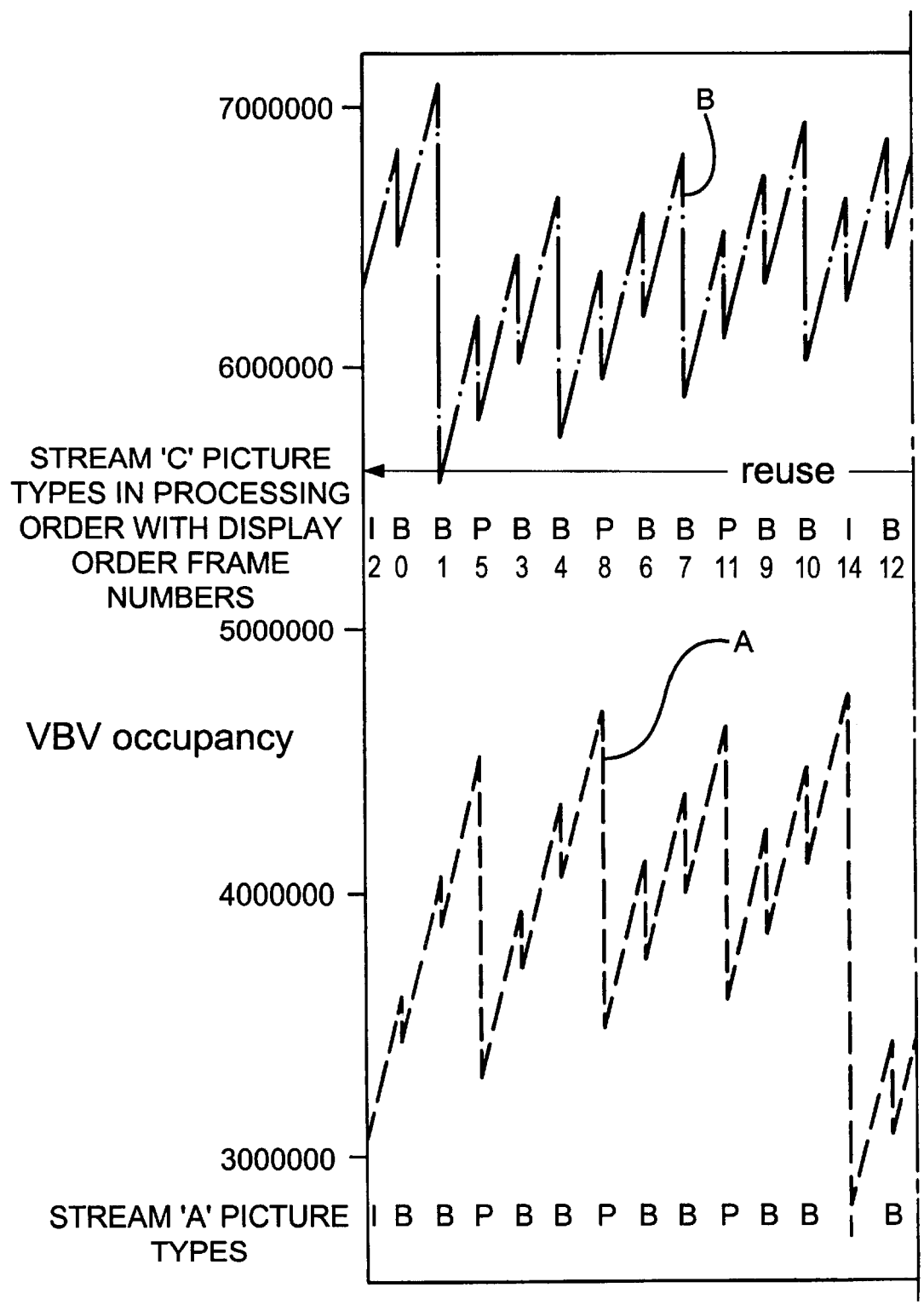
Figure 6B:
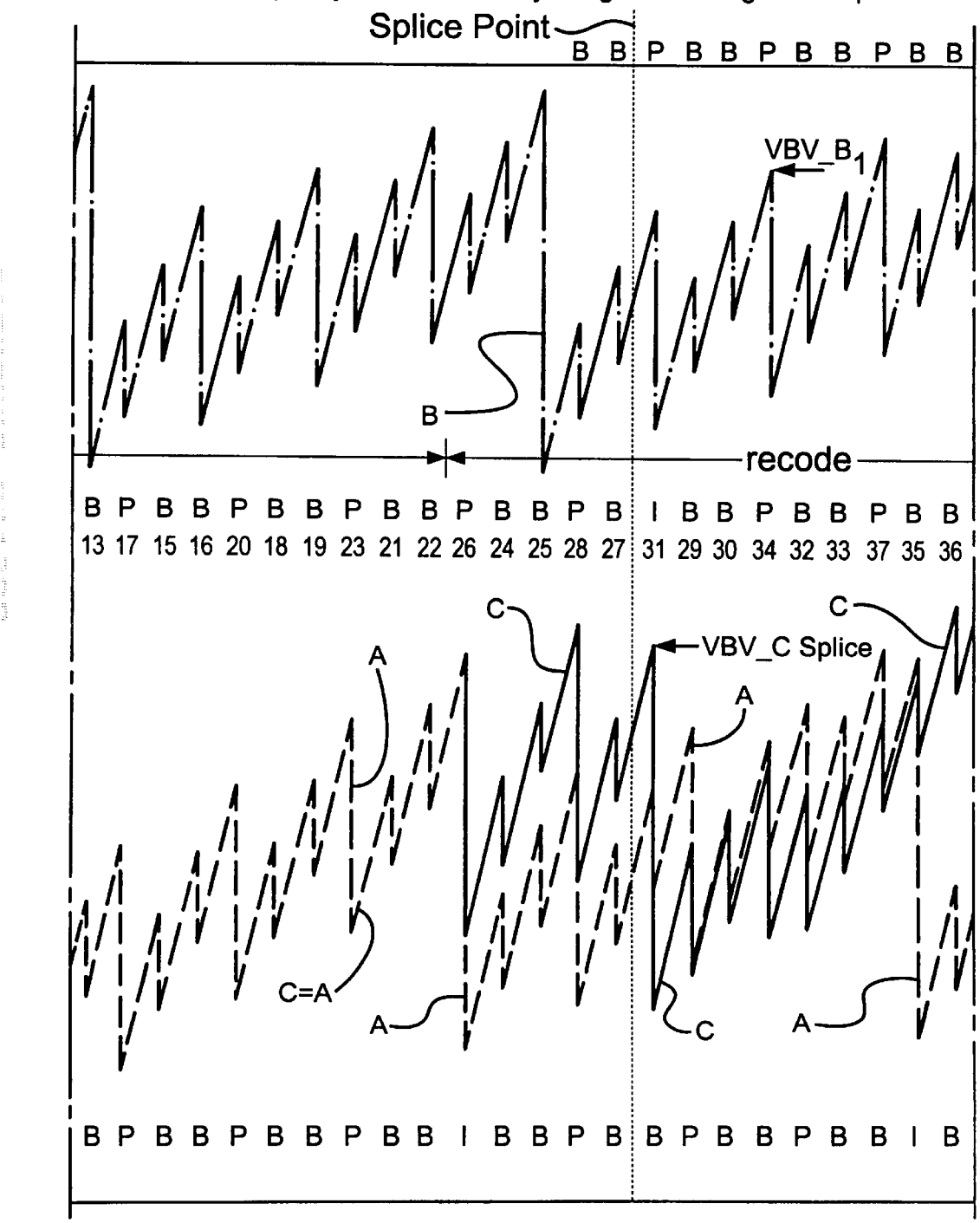
Figure 6C:
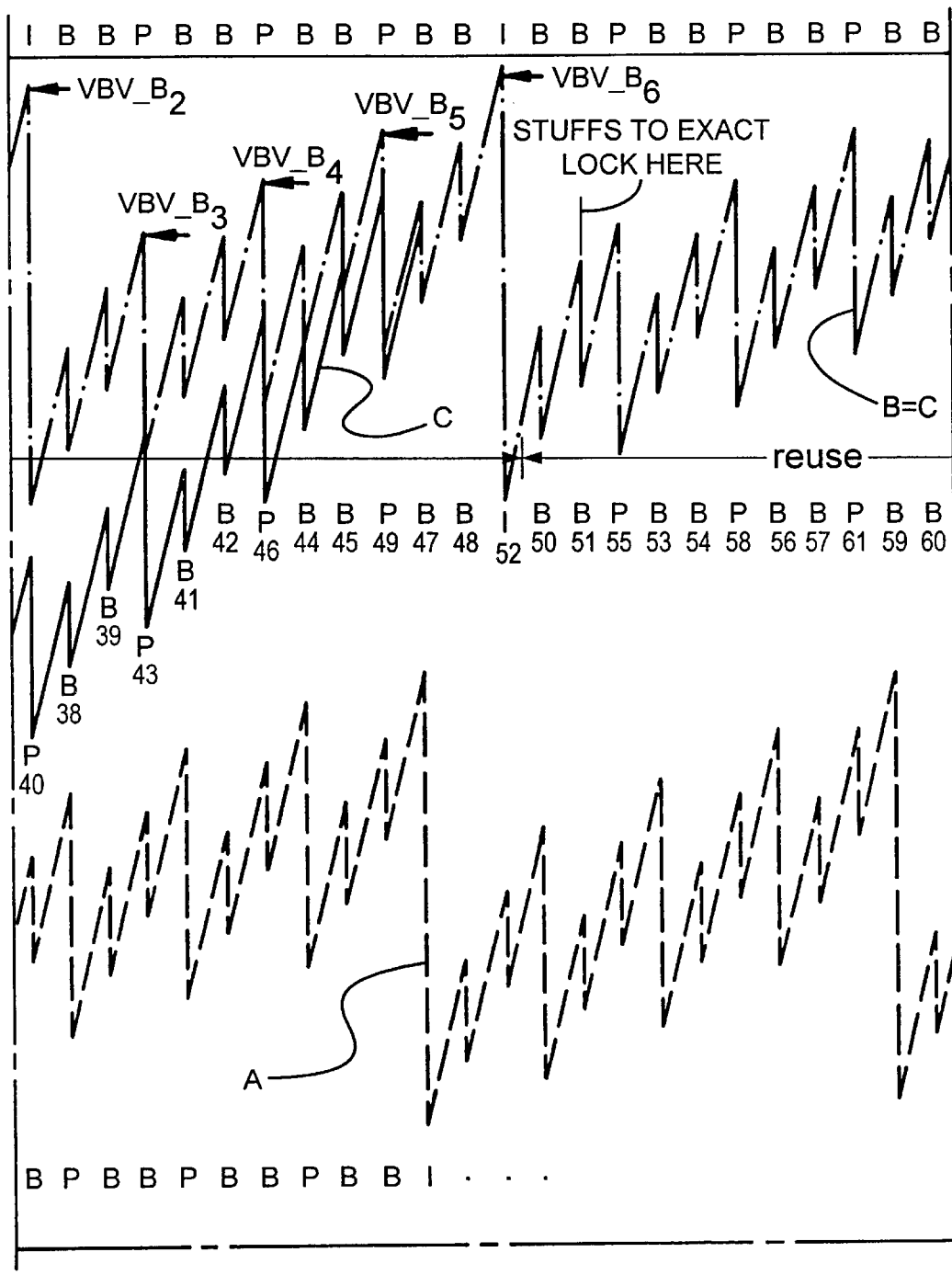
Figure 6D:
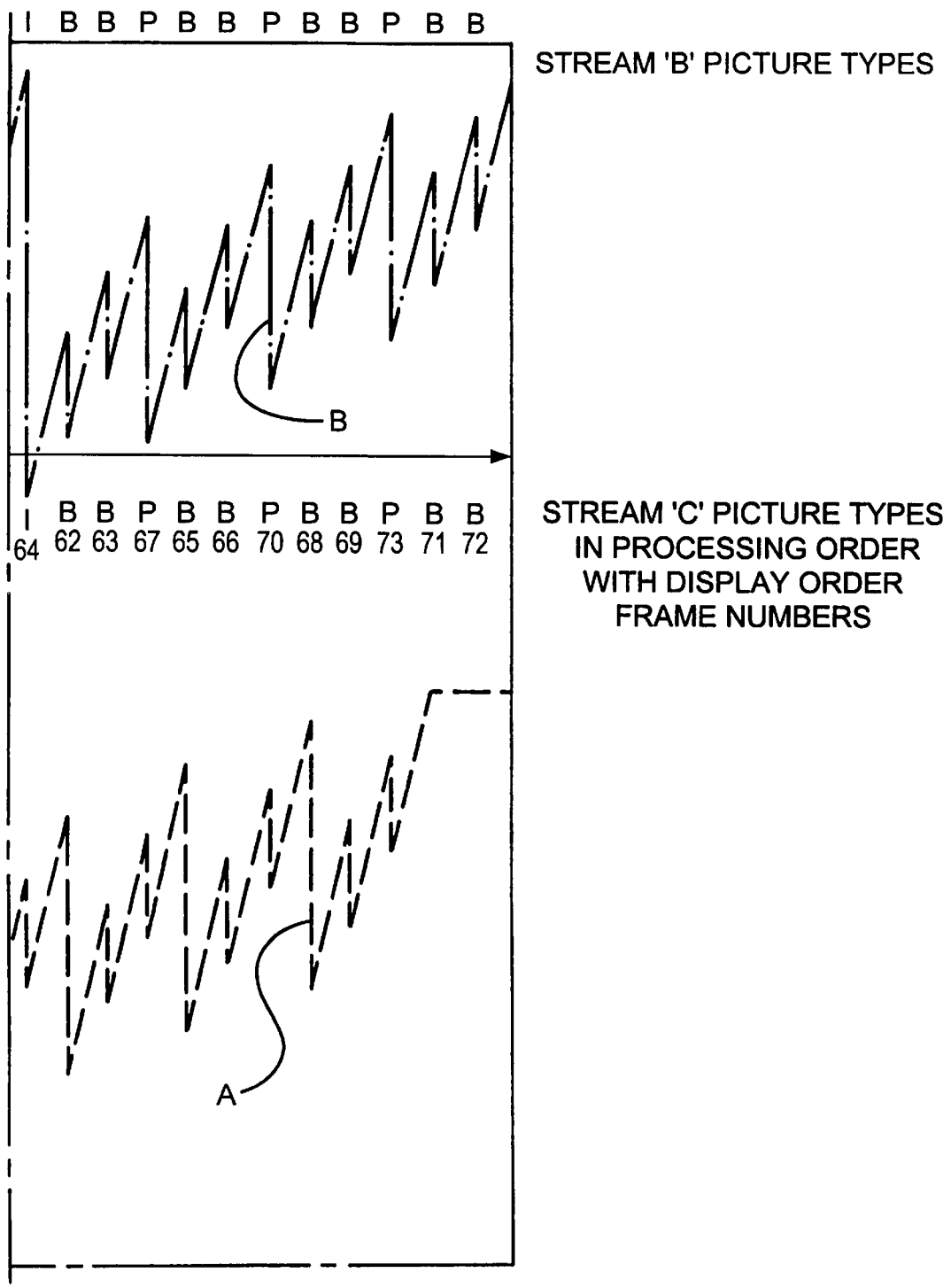
Figure 7A:
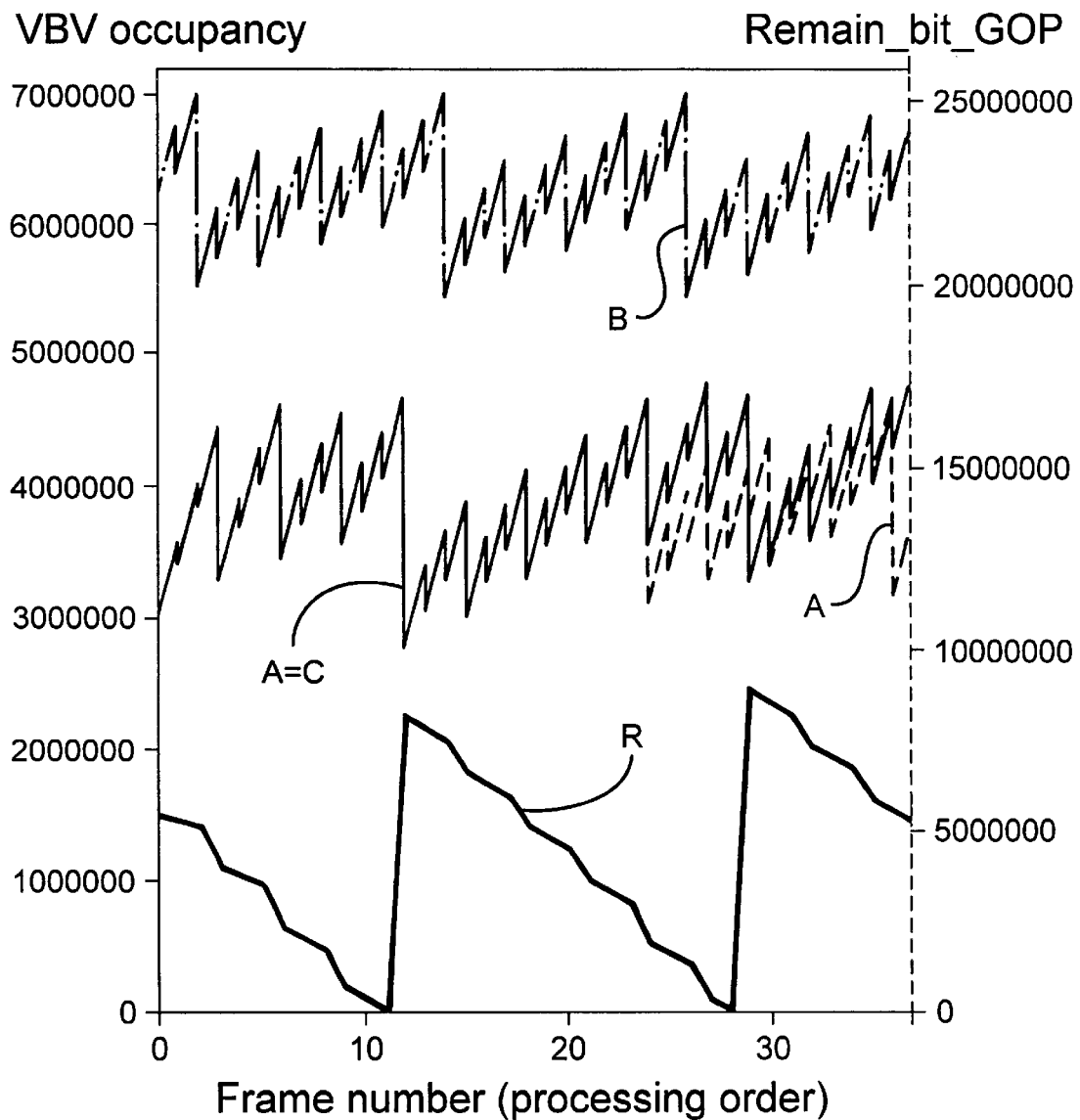
FIGS. 7A and 7B show the VBV occupancy graphs of FIGS. 6A to D together with Remain_bit_GOP.
Figure 7B:
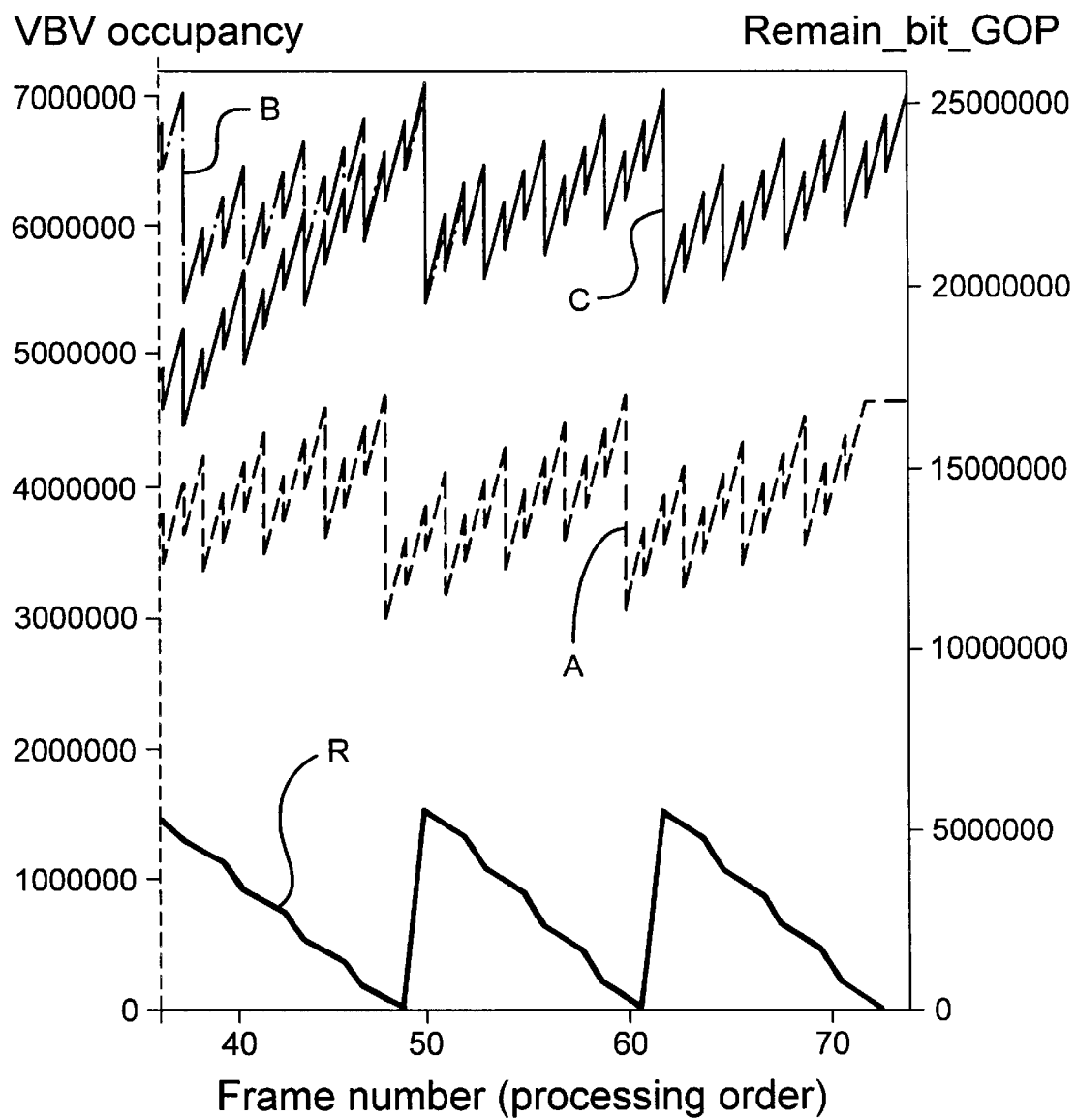
Figure 8A:
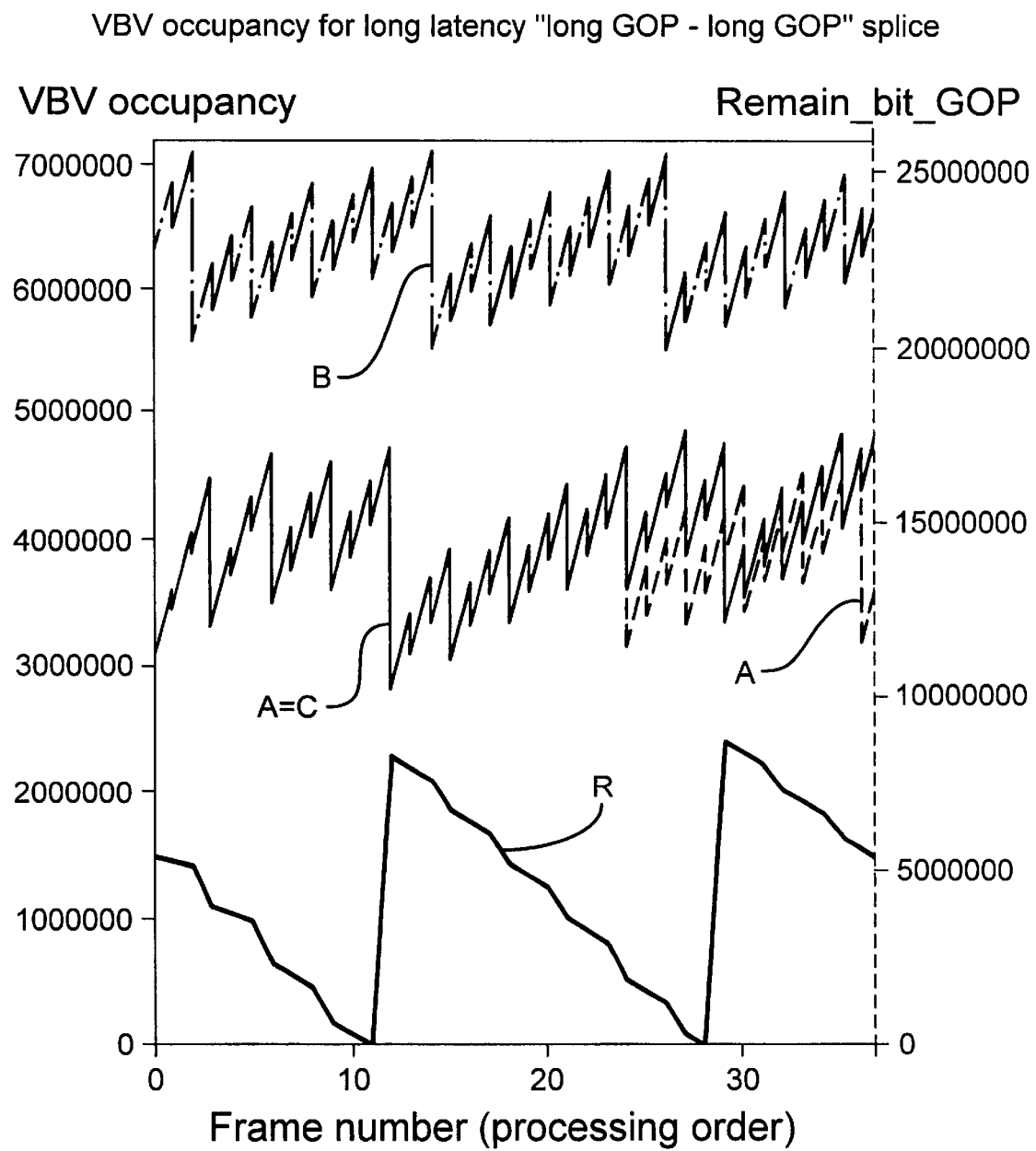
FIGS. 8A and B shows illustrative values of VBV occupancy and Remain _bit_GOP for the GOPs of FIG. 4 for another embodiment of the invention.
Figure 8B:
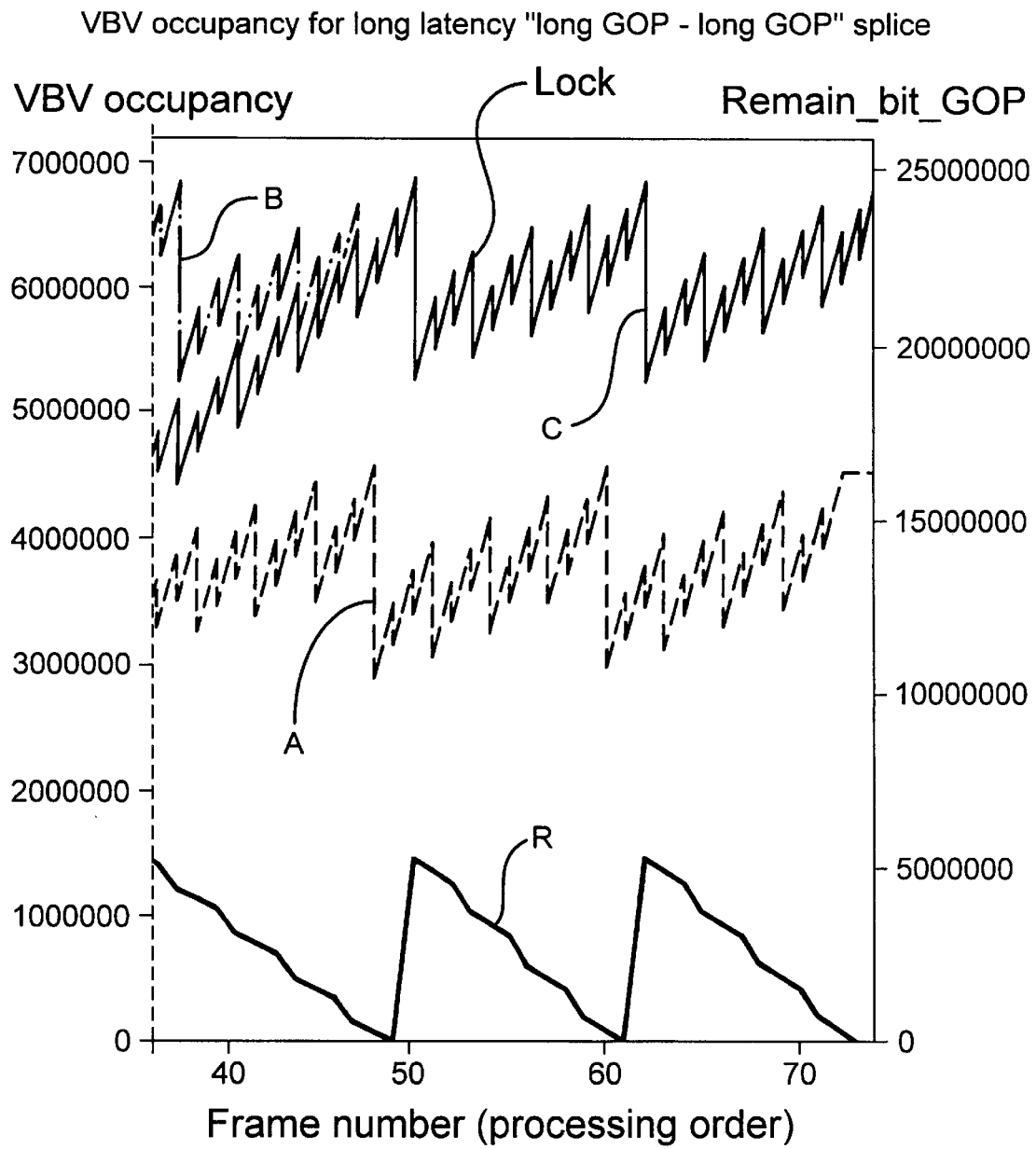

The downstream decoder 2 has a buffer 8. The encoding which takes place in encoder 4 of the processing is arranged so that the buffer 8 of the downstream decoder 2 neither underflows nor overflows. FIGS. 6, 7 and 8 shows the operation of the downstream buffer 8 of the downstream decoder 2.

(The encoder 4 has a corresponding buffer and it operates as the inverse of what is shown in FIGS. 6, 7 and 8.)

The following are known MPEG rate control parameters.

VBV

VBV is video buffer verifier. It is a measure of the number of bits that would be in the downstream buffer 8.

Remain_bit_GOP

Remain_bit_GOP is a target number for the total number of bits for the remainder of the current GOP. At the beginning of a GOP, it is a target for the whole GOP. It reduces as the GOP progresses.

Complexity X, Constants Kp, Kb and N, Np, Nb

N is the number of pictures in a GOP.

Np is the number of P frames in a GOP.

Nb is the number of B frames in a GOP.

Kp and Kb are 'universal' estimates dependent on quantisation matrices. They (indirectly) define the relative sizes of I, P and B frames. Xi, Xp, Xb are "complexity measures" for I, P and B frames.

These parameters are used in a known manner to distribute the bits of a GOP amongst I, P and B frames.

They are further explained in "Test Model 5" published by "International Organisation for Standardisation Organisation Internationale De Normalisation, Coded Representation of Picture and Audio Information ISO/IEC JTC1/SC29/WG11/N0400".

Achieving VBV_Lock

As discussed above, the downstream buffer 8 must neither underflow nor overflow. In MPEG-2 the buffer is normally kept approximately half-full. A discontinuity in the bit stream can make the buffer underflow or overflow. VBV is the measure of buffer occupancy.

FIGS. 6, 7 and 8 show, as an extreme case, buffer occupancy VBV for two bitstreams $A_0$ and $B_0$. $A_0$ has a typical occupancy and $B_0$ has unusually high occupancy.

In FIGS. 6, 7 and 8, A, B and C indicate buffer occupancies for bitstreams $A_0$ $B_0$ and C. R indicates Remain_bit_GOP.

In the situation where the bitstream begins with $A_0$ with typical occupancy and $B_0$ with high occupancy is spliced onto $A_0$ at the splice point, it is necessary to:
 a) provide continuity, albeit changing, of VBV occupancy; and
 b) change the VBV occupancy from the value of stream $A_0$ just before the splice to a target value which is the value of VBV for stream $B_0$.

As best shown in FIG. 7 or 8, the VBV of bit stream C begins identical to $A_0$, then changes progressively towards the VBV of $B_0$.

The point at which the VBV occupancy of C becomes identical to that of stream $B_0$ is the VBV_lock point.

As mentioned above FIGS. 6, 7 and 8 show occupancy of the downstream buffer 8. To achieve VBV_lock the encoder 4 is controlled.

FIGS. 6 and 7 show the second method (referred to herein as "short latency)" of achieving VBV lock. FIG. 8 shows the first method (referred to herein as "long latency") which uses the picture type decision rules set out above. The first method of FIG. 8 will be described followed by the second method.

First Method (Long Latency)

a) The first method uses the picture type decision rules (1) to (4) above unchanged.

b) Adjust Remain_bit_GOP.

A 'transitional GOP' is defined starting at the splice point SPLICE and ending at a point defined by the picture decision rules.

The length of the transitional GOP (i.e. the number of frames in the GOP) is known from the result of adjusting the GOP length using the picture decision rules. (This can be achieved because the processor P stores for example 30 frames as mentioned above).

The value of Remain_bit_GOP is reset to zero at the splice point. The value of Remain_bit_GOP is recalculated in normal manner for the transitional GOP following the splice point, and
 a value Extra_bits is added to the result, where Extra-bits is
 [VBV_C_Splice—VBV_B_Lock]
 where VBV_C_Splice is VBV occupancy of stream C immediately before the splice which is always the end of the previous GOP adjusted in accordance with the picture decision rules; and VBV_B_Lock is the VBV occupancy of the stream $B_0$ at the end of the new transitional GOP. This value is known because the frames of the stream $B_0$ are stored and the length of the new GOP is known.
 Extra-bits can be negative.

The initial value of Remain_bit_GOP calculated in this way is reduced for example by multiplying it by a factor α where α is one or less. The factor α is chosen to reduce the value of Remain_bit_GOP by a small amount e.g. 5% or less so that spare bits allow additional bits ('stuffing' bits) to be added to achieve exact lock. The need for this will be explained below. The factor α is empirically determined. In the following discussion it is assumed to be fixed. However it may be varied.

Remain_bit_GOP is then updated at every frame by the number of bits used to encode that frame up to the end of the transitional GOP.

c) Complexity

Stream $A_0$ is decoded and reencoded before the splice. Thus encoding occurs with complexity values appropriate to stream $A_0$. However, these values are not appropriate for stream $B_0$. Thus before the splice, complexity values $X_I$, $X_P$, $X_B$ of the I, P and B frames of stream $B_0$ immediately before the splice are calculated based on $$X = S.Q$$

where X=complexity value
 S=number of bits generated by encoding a picture
 Q=average quantisation parameter of all macroblocks in a picture.

X=S.Q is a standard equation for rate control in MPEG.

Alternatively, the complexity values may be derived from the first I, P and B frames after the splice or from the I, P and B frames nearest the splice.

At the splice point these complexity values replace the existing values (of stream $A_0$). So after the splice complexity values appropriate to stream $B_0$ are used.

The complexity values control the distribution of bits amongst I, P and B frames. Achieving good subjective quality is dependent on the complexity values.

d) Virtual Buffers Modification

The virtual buffers are used to calculate the reference Q scale for each macroblock. Improvement in quality can be gained by setting the virtual buffers to estimated stream $B_0$ values at the splice point. This ensures that the resulting Q scales are similar to those used in stream $B_0$ in the previous generation, instead of continuing with the Q scales of stream $A_0$.

StreamB virtual buffer values are estimated for the last I, P and B frames before the splice point, based on Q. Alternatively they are estimated from the first I, P and B frames after the splice or from the I, P and B frames nearest the splice.

For the I frame, the value is calculated as:

$$\text{estimated\_buf}_I = (2*Q*\text{bit\_rate})/(31*\text{frame\_rate}).$$

Q is the average quantization parameter.

This value is then forced at the splice point.

This is also done for the P and B virtual buffers in same way.

The control 6 controls the encoding in encoder 4 in accordance with Remain_bit_GOP, between the splice point SPLICE and VBV_lock so that the occupancy of the downstream buffer 8 follows a continuous but changing trajectory from before the splice at bitstream A occupancy to VBV_lock at the bitstream B occupancy. The control is also used to force the complexity and virtual buffers as described above.

In order to increase occupancy of the downstream buffer as shown in FIG. 6, the buffer in the encoder is controlled to output pictures with smaller number of bits, so that its occupancy decreases. Pictures with smaller numbers of bits are produced by increased compression/coarser quantisation.

If the trajectory is from high occupancy of the downstream buffer to lower occupancy of the downstream buffer, the encoder is controlled in accordance with the higher Remain-bit-GOP to increase occupancy of its buffer, producing larger pictures by less compression/finer quantisation.

Various modifications may be made to the first method. The VBV values of a bitstream, e.g. stream B tend to maintain roughly constant peak values. Thus instead of finding the peak VBV of stream B at the predicted lock point VBV_lock, the VBV value of stream B at the I frame closest to the splice point could be used as a prediction of occupancy at VBV_lock.

The value of the prediction can be adjusted periodically through the GOP as in the Second Method as follows.

Second Method (Short Latency)

a) The second method uses the picture decision rules (1) to (4) above but with the following modification:

Rule (1) is changed to (1') The last 'I' or 'P' frame of the bitstream (A) before the splice is converted to 'P'.

The result of the picture decision rules in the example shown in FIGS. 6A to D is exactly the same as in the first method.

b) Adjust Remain_bit_GOP.

In order to increase occupancy of the downstream buffer as shown in FIG. 6, the buffer in the encoder is controlled in accordance with Remain_bit_GOP to output pictures with smaller number of bits so that its occupancy decreases. Pictures with smaller number of bits are produced by increased compression/coarser quantisation.

If the trajectory is from high occupancy of the down stream buffer to lower occupancy of the downstream buffer, the encoder is controlled in accordance with the higher Remain_bit_GOP to increase occupancy of its buffer, producing larger pictures by less compression/finer quantisation.

Remain_bit_GOP is the target for the number of bits remaining in the transitional GOP as discussed in the first method.

The length of the transitional GOP is known from the result of adjusting the GOP length using the picture decision rules modified for the second method.

The value of Remain_bit_GOP is reset to zero at the splice point. The value of Remain_bit_GOP is recalculated in normal manner for the new GOP following the splice point. The value of Remain_bit_GOP at the splice is changed by a value VBV_diff where $$VBV\_diff = VBV\_C\_splice - VBV\_B\_next\ I\ or\ P.$$

That is, Remain_bit_GOP is initially set to the sum of [the normal allocation of bits for the GOP] and [the difference between (the VBV value of stream C at the splice) and (the VBV value at the first I or P frame following the splice of the stream B)]. This is a prediction of the VBV of the bitstream B at the VBV_lock point. The value of Remain_bit_GOP is then reduced, by a factor a for the transitional GOP as in the first method.

The factor α reduces Remain_bit_GOP for the transitional GOP by an empirically determined amount e.g. 5% or less. It is assumed herein that a is fixed. It may be varied.

Remain_bit_GOP is updated at every frame by the number of bits used to encode that frame. In addition, the following update occurs:

At the splice point VBV_diff is based on (VBV_C_splice−VBV_B_next I or P). Subsequently at every succeeding I and P frame of the stream B, VBV_Diff=VBV_B_current_I or P−VBV_B_next I or P. If VBV_diff is positive the change is divided by the number of I and P frames in the remainder of the transitional GOP and the result added to Remain_bit_GOP at each subsequent update. If VBV_diff is negative, Remain_bit_GOP is reduced by VBV_diff. In stream C of FIGS. 7 and 8, Remain_bit_GOP is thus updated every 3 frames. This continues until VBV_lock is achieved.

The initial value of Remain-bit GOP is reduced by the factor α. α is chosen to reduce the value of Remain-bit-GOP so that spare bits are available at VBV_lock. The spare bits allow additional bits ("stuffing bits") to be added to achieve exact lock. The need for this will be explained hereinbelow.

The differences VBV_diff can be calculated because the frames are stored.

c) Complexity This is dealt with in the same way as in the first method.

d) Virtual Buffer Modification This is dealt with in the same way as in the first method.

VBV_Lock point

This applies to both the first and second methods.

The period over which VBV_lock is predicted to be achieved is one GOP albeit a GOP the length of which may be changed by the picture type decision rules. In this example it is about 23 frames.

Figure 2:
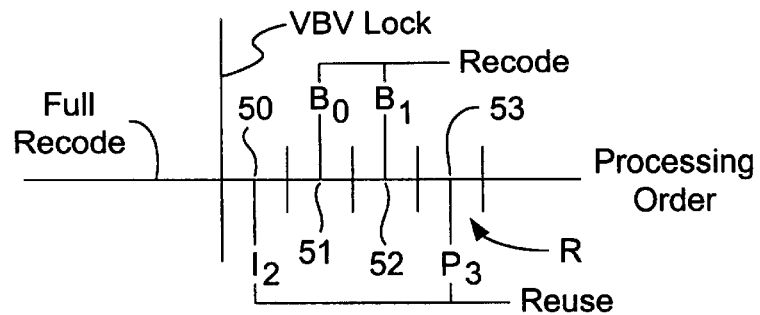
FIG. 2 illustrates a portion R of the chart of FIG. 1 in more detail.

Referring to FIGS. 2, 4, 5 and 6 assume lock is achieved at I-frame 52 in display order (FIG. 2 or 4). In fact the VBV_lock is achieved in the processing order so that it occurs at reordered I frame 50 (FIG. 5). The following B frames 51 and 52 in FIG. 2 or 5 are fully recoded frames from prior to VBV_lock and disturb the lock. Thus the spare bits are used at the second B frame 52 to stuff the bitstream to achieve exact lock.

If the factor α is one, then no spare bits are available so the system attempts to achieve exact lock at the I frame immediately after the end of the transitional GOP. The rate control under or over steers producing usually too many bits. Even if exact lock is achieved at the I frame, lock is disturbed at the B frames. Thus, Remain_bit_GOP is reduced by the factor α, and rate control oversteers so that spare bits are available at the end of the GOP. The spare bits are used to achieve exact lock at the second B frame.

The I-frame 50 is processed by reusing its parameters derived from the original bitstream $B_0$. After the fully recoded B frames 51 and 52, re-use of parameters resumes until the original bitstream $B_0$ is directed directly to the output of the processor bypassing the decoding and re-coding.

This applies to both the first and second methods.

Modifications

The discussion hereinabove assumes VBV_lock will be achieved at the end of the transitional GOP after the splice point. VBV_lock may not occur in the event of extreme differences between the two bitstreams.

In the second method, the value of Remain_bit_GOP is updated every 3 frames and the process of trying to achieve VBV_lock progresses until lock is achieved.

In the first method, within the transitional GOP after the splice point, lock is achieved with the appropriate value of α. α is chosen so that lock is achieved except for the extreme case. α may be variable.

The picture type decision rule (4) may be changed to be $(4^1)$:

$(4^1)$ If the first GOP after the splice contains only one 'P' frame, the frame types of the next GOP are altered from; 'I' to 'P'; and 'P' to 'I'; to give two 'P' frames in a GOP.

This results in two shorter GOPs between the splice point and VBV_lock.

In this case Extra bits is divided between the two GOPs in suitable proportion.

(Extra-bits could be negative).

Some bit streams may comprise only I and B frames or only I and P frames.

Motion Vectors

Motion vectors are regenerated for the frames of the transitional GOP. Alternatively motion vectors could be estimated from vectors in neighboring frames.

The motion vectors for frames of the transitional GOP may be derived from the corresponding frames of the original bitstream $A_0$ or $B_0$. If an I frame is changed to P because of the picture decision rules concealment vectors maybe used if they are present: see the Atlantic paper discussed hereinbefore. For other frames, that is frames recoded from P and B frames, vectors are available. However, if a B frame is recoded as P, the vectors may need to be modified to point to the appropriate frame preceding the frame recoded as P.

Bit Growth on Frames Outside Transition Region

As shown in FIG. 1 after the end of the transitional GOP, the frames of the bitstream B are recoded with reuse of transcoding parameters until stream $B_0$ bypasses the decoder B and encoder 4.

The VBV of such recoded frames may not be the same as their original forms. The number of bits may shrink or grow because inverse DCT and DCT processes are subject to errors, and because of de-quantization and quantization errors, in decoding and re-encoding. If the shrinkage or growth is excessive the downstream buffer may under-or over-flow.

The frames are monitored. If excessive shrinkage occurs bit-stuffing is used, and if excessive growth occurs frames are recoded to maintain occupancy with normal MPEG limits. Preferably encoding reuses the transcoding parameters of the I frames to maintain picture quality.

The foregoing describes by way of example a signal processor and a method of processing signals. The processor, and the method, may be implemented using special purpose hardware which may include a programmable computer or be a programmable signal processor. The signal processing method may be embodied in a computer program product, which, when run on the computer or other programmable processor, implements the method.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A signal processor for splicing a compressed bitstream B to a compressed bitstream A, comprising
    means for decoding the bitstreams A and B, means for switching from decoded bitstream A to decoded bitstream B to splice bitstream B to bitstream A to produce a spliced bitstream C, encoding means for re-encoding the spliced bitstream C for supply to a downstream decoder having a downstream buffer, wherein the encoding is controlled by control means to produce a prediction of the position on bitstream B at which occupancy of the downstream buffer by spliced bitstream C equals what would have been the occupancy by bitstream B alone, and
    the value of occupancy for bitstream C is controlled between the splice point and the predicted position in accordance with the difference between the occupancy value of stream A immediately before the splice and a prediction of the occupancy value of bitstream C at the predicted position.

2. A processor according to claim 1, wherein said prediction of the occupancy value of stream C is the occupancy value of stream B at the predicted position.

3. A processor according to claim 1, wherein the prediction of the occupancy value of stream C is the peak occupancy value of stream B at a point adjacent to the splice point.

4. A processor according to claim 1, for processing bitstreams A and B which are video bitstreams each having sequences of compressed frames each sequence having a predetermined number of frames, and which produces a transitional sequence having a number of frames dependent on the position of the splice in the sequence of streams A and B following splice point,
    the transitional sequence providing the predicted position.

5. A processor according to claim 4, wherein the transitional sequence is defined by a predetermined set of rules.

6. A processor according to claim 5, for processing MPEG bit streams comprising Groups of Pictures (GOPs), and the transitional sequence is a transitional GOP defined by the rules.

7. A processor according to claim 6, wherein the control means calculates for the transitional GOP a target number of bits Remain_bit_GOP for the GOP, and controls the value of occupancy for bitstream C within the transitional GOP in dependence upon Remain_bit_GOP.

8. A processor according to claim 7, wherein Remain_bit_GOP is reduced by a small amount.

9. A processor according to claim 8, wherein additional bits are added to the stream C after the position at which the occupancy value for stream C approximately equals that for stream B to achieve equality.

10. A processor according to claim 6, wherein the picture type of any frame which is not a B frame immediately before the splice point is changed to P.

11. A processor according to claim 10, wherein if there are two 'I' or 'P' frames before the splice point they are converted so both are 'P' frames.

12. A processor according to claim 10, wherein if the last frame before the splice is a 'B' frame, it is changed to a 'P' frame.

13. A processor according to claim 6, wherein the transitional GOP has I and P and/or B frames, and wherein the transitional GOP is produced by modifying stream B following the splice point so that the first I or P frame after the splice is converted to I.

14. A processor according to claim 13, wherein if the transitional GOP has less than three P frames, the I frame of the subsequent GOP is converted to P.

15. A processor according to claim 13, wherein if the first GOP after the splice contains only one 'P' frame, the frame types of the next GOP are altered from: 'I' to 'P'; and 'P'to 'I'.

16. A processor according to claim 6, wherein the transitional GOP is produced by modifying the stream B after the splice so that it has
    a) an I frame at the beginning of the transitional GOP following the splice point, and, in addition to the I frame,
    b) at least three 'P' frames.

17. A processor according to claim 6, wherein Remain_bit_GOP is calculated as the sum of;

a) a difference between the values of occupancy of stream C at the splice point and the prediction of the occupancy value of bitstream C at the predicted position; and b) the number of bits calculated for the GOP as if the difference a) was zero.

18. A processor according to claim 17, wherein the value of Remain_bit_GOP is reduced on every frame by the number of bits used to encode that frame.

19. A processor according to claim 6, wherein Remain_bit_GOP is initially calculated as the sum of a) the difference D1 between the occupancy value of stream C at the splice and the occupancy value of the nearest I or P frame of stream B following the splice; and b) the number of bits calculated for the GOP as if the difference a) was zero.

20. A processor according to claim 19, wherein Remain_bit_GOP is subsequently changed at every I and P frame.

21. A processor according to claim 20, wherein Remain_bit_GOP is subsequently changed at every I and P frame in dependence upon the difference D2 between a) the occupancy value of stream B at the current I or P frame;

b) the occupancy value of stream B at the succeeding I or P frame.

22. A processor according to claim 21, wherein, if the difference D2 is negative, Remain_bit_GOP is reduced by the difference D2.

23. A processor according to claim 19, wherein, if the difference D1 or D2 is positive, a value E equal to the difference D1 or D2 divided by the number of I and P frames remaining in the GOP is calculated and E is added to Remain_bit_GOP at each subsequent I and P frame in the GOP.

24. A processor according to claim 19, wherein the value of Remain_bit_GOP is reduced on every frame by the number of bits used to encode that frame.

25. A processor according to claim 15, wherein a value F is calculated as the sum of;

a) the difference between the values of occupancy of stream C at the splice point and the prediction of the occupancy value of bitstream C at the predicted position; and b) the number of bits calculated for the GOP as if the difference a) was zero, and F is apportioned between the first and next GOPs.

26. A processor according to claim 6, wherein the complexity values of stream B replace those of stream A at the splice point.

27. A processor according to claim 6, wherein the virtual buffer values of stream B replace those of stream A at the splice point.

28. A signal processing method for splicing a compressed bitstream B to a compressed bitstream A, comprising decoding the bitstreams A and B, switching from decoded bitstream A to decoded bitstream B to splice bitstream B to bitstream A to produce a spliced bitstream C, re-encoding the spliced bitstream C for supply to a downstream decoder having a downstream buffer, wherein the encoding is controlled by to produce a prediction of the position on bitstream B at which occupancy of the downstream buffer by spliced bitstream C equals what would have been the occupancy by bitstream B alone, and the value of occupancy for bitstream C is controlled between the splice point and the predicted position in accordance with the difference between the occupancy value of stream A immediately before the splice and a prediction of the occupancy value of bitstream C at the predicted position.

29. A method according to claim 28, wherein said prediction of the occupancy value of stream C is the occupancy value of stream B at the predicted position.

30. A method according to claim 28, wherein the prediction of the occupancy value of stream C is the peak occupancy value of stream B at a point adjacent to the splice point.

31. A method according to claim 28, for processing bitstreams A and B which are video bitstreams each having sequences of compressed frames each sequence having a predetermined number of frames, and which produces a transitional sequence having a number of frames dependent on the position of the splice in the sequence of streams A and B following splice point, the transitional sequence providing the predicted position.

32. A method according to claim 31, wherein the transitional sequence is defined by a predetermined set of rules.

33. A method according to claim 32, for processing MPEG bit streams comprising Groups of Pictures (GOPs) and the transitional sequence is a transitional GOP defined by the rules.

34. A method according to claim 33, wherein a target number of bits Remain_bit_GOP is calculated for the transitional GOP, and the value of occupancy for bitstream C within the transitional GOP is controlled in dependence upon Remain_bit_GOP.

35. A method according to claim 34, wherein Remain_bit_GOP is reduced by a small amount.

36. A method according to claim 35, wherein additional bits are added to the stream C after the position at which the occupancy value for stream C approximately equals that for stream B to achieve equality.

37. A method according to claim 33, wherein the picture type of any frame which is not a B frame immediately before the splice point is changed to P.

38. A method according to claim 37, wherein the two 'I' or 'P' frames before the splice part are converted so both are 'P' frames.

39. A method according to claim 37, wherein if the last frame before the splice is a 'B' frame, it is changed to a 'P' frame.

40. A method according to claim 33, wherein the transitional GOP has I and P and/or B frames, and wherein the transitional GOP is produced by modifying stream B following the splice point so that the first I or P frame after the splice is converted to I.

41. A method according to claim 40, wherein if the transitional GOP has less than three P frames, the I frame of the subsequent GOP is converted to P.

42. A method according to claim 40, wherein if the first GOP after the splice contains only one 'P' frame, the frame types of the next GOP are altered from 'I' to 'P' and 'P' to 'I'.

43. A method according to claim 33, wherein the transitional GOP is produced by modifying the stream B after the splice so that it has a) an I frame at the beginning of the transitional GOP following the splice point, and, in addition to the I frame, b) at least three 'P' frames.

44. A method according to claim 33, wherein Remain_bit_GOP is calculated as the sum of;

a) the difference between the values of occupancy of stream C at the splice point and the prediction of the occupancy value of bit stream C at the predicted position; and b) the number of bits calculated for the GOP as if the difference a) was zero.

45. A method according to claim 44, wherein the value of Remain_bit_GOP is reduced on every frame by the number of bits used to encode that frame.

46. A method according to claim 33, wherein Remain_bit_GOP is initially calculated as the sum of a) the difference D1 between the occupancy value of stream C at the splice and the occupancy value of the nearest I or P frame of stream B following the splice; and b) the number of bits calculated for the GOP as if the difference a) was zero.

47. A method according to claim 46, wherein Remain_bit_GOP is subsequently changed at every I and P frame.

48. A method according to claim 47, wherein

Remain_bit_GOP is subsequently changed at every I and P frame in dependence upon the difference D2 between a) the occupancy value of stream B at the current I or P frame;

b) the occupancy value of stream B at the succeeding I or P frame.

49. A method according to claim 48, wherein, if the said difference D2 is negative, Remain_bit_GOP is reduced by the difference D2.

50. A method according to claim 46, wherein, if the difference D1 or D2 is positive, a value E equal to the difference D1 or D2 divided by the number of I and P frames remaining in the GOP is calculated and E is added to Remain_bit_GOP at each subsequent I and P frame in the GOP.

51. A method according to claim 46, wherein the value of Remain_bit_GOP is reduced on every frame by the number of bits used to encode that frame.

52. A method according to claim 42, wherein a value F is calculated as the sum of;

a) the difference between the values of occupancy of stream C at the splice point and the prediction of the occupancy value of bitstream C at the said predicted position; and b) the number of bits calculated for the GOP as if the said difference a) was zero, and F is apportioned between the first an next GOPs.

53. A method according to claim 33, wherein the complexity values of stream B replace those of stream A at the splice point.

54. A method according to claim 33, wherein the virtual buffer values of stream B replace those of stream A at the splice point.

55. A computer program product arranged to implement the method of claim 28 when run on a programmable signal processor.

* * * * *